United States Patent [19]

Herrington

[11] Patent Number: 4,684,359

[45] Date of Patent: Aug. 4, 1987

[54] MOVABLE CLAMP ORIENTER FOR DRAW TAPE

[75] Inventor: Fox J. Herrington, Holcomb, N.Y.

[73] Assignee: Mobil Oil Corporation, New York, N.Y.

[21] Appl. No.: 894,163

[22] Filed: Aug. 7, 1986

Related U.S. Application Data

[63] Continuation-in-part of Ser. No. 789,242, Oct. 18, 1985, abandoned.

[51] Int. Cl.[4] .................. B31B 23/86; B31B 1/90; B31D 1/06
[52] U.S. Cl. .................. 493/211; 493/225; 493/338; 493/461; 493/928; 264/288.8; 264/DIG. 73; 26/71; 28/243
[58] Field of Search .............. 493/211, 225, 338, 339, 493/460, 461, 480, 928, 962; 264/73, 164, 167, 280, 288.4, 288.8, 291, DIG. 28, DIG. 73; 425/66, 76, 363, 367, 383, 384, DIG. 53, DIG. 236; 26/71; 28/243

[56] References Cited

U.S. PATENT DOCUMENTS

| 2,847,703 | 8/1958 | Schrenk et al. | 28/243 |
| 2,932,850 | 4/1960 | McNeill et al. | 264/167 |
| 3,395,200 | 7/1968 | Mader, Jr. et al. | 425/66 |
| 4,140,457 | 2/1979 | Miki et al. | 425/384 |
| 4,141,679 | 2/1979 | Asano et al. | 425/445 |

FOREIGN PATENT DOCUMENTS 885513  12/1961  United Kingdom ....... 425/DIG. 17

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

A thermoplastic draw tape having thick and wide end portions with a relatively thin and narrow central portion between them is produced by movable clamps which stretch the tape between stationary clamps to produce the stretched, oriented portions of the tape. A plurality of movable clamps and a plurality of stationary clamps produce a plurality of stretched central portions so that the stretching time can be greater than the cycle time of bag making machinery with which the stretching apparatus is synchronized.

10 Claims, 10 Drawing Figures

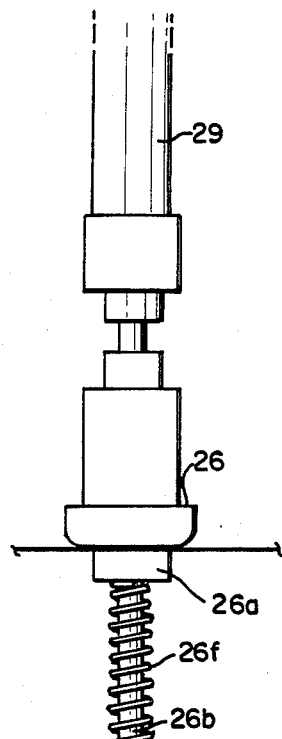
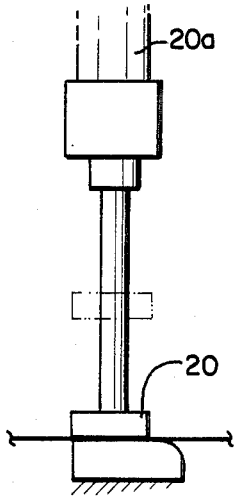
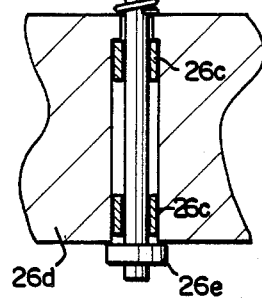
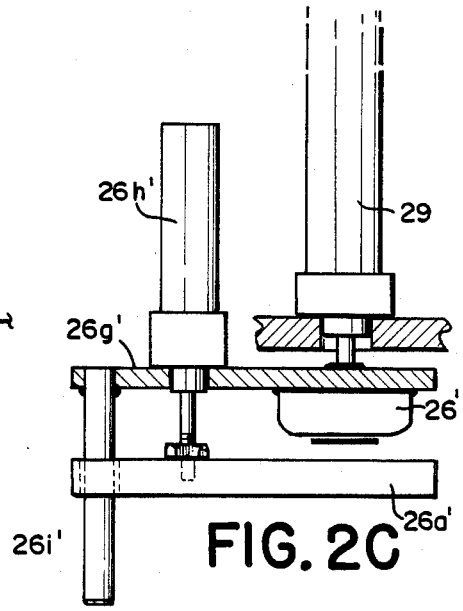
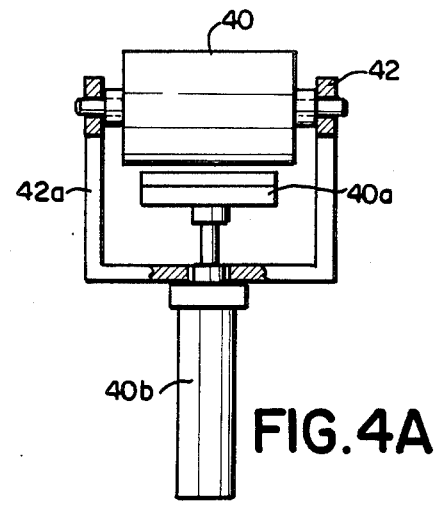

MOVABLE CLAMP ORIENTER FOR DRAW TAPE

RELATED APPLICATION

This application is a continuation-in-part of parent application Ser. No. 789,242, filed Oct. 18, 1985, abandoned.

BACKGROUND OF THE INVENTION

This invention relates to the manufacture of draw tape for thermoplastic bags, and more particularly, to making an intermittently stretched and oriented draw tape.

Bags made of thin polyethylene material have been used in various sizes. Small bags are used in the packaging of sandwiches and the like; larger bags are used as shopping bags; and even larger bags are used for containing trash.

A particularly advantageous closure for such a bag includes a draw tape constructed from the same polyethylene material. U.S. Pat. No. 3,029,853—Piazzi, and British Pat. No. 1,125,363—Jortikka are examples of draw tape bags. Such closures have been successfully employed on these bags.

Draw tape closures for large trash bags, and the manufacture of these draw tape trash bags, are described in the related applications identified below.

In such bags, the tape is preferably unoriented polyethylene which is heat sealed to the opposing panels of the bag at the sides thereof. The weakest part of the draw tape is at the heat seal. This weak point should be located at the point of lowest tensile load, which is furthest from where the user pulls the tape. For this reason, the tape is normally in a hem with a notch at the center of the bag, so that the user grasps the tape at a point furthest from the heat seal.

Economy of manufacture is one of the prime considerations in these bags. The cost of the draw tape is a significant part of the total bag cost, so that any economies in draw tape cost advantageously reduce the ultimate cost of the bag.

As more fully set forth in the Herrington application identified below, an improved draw tape for trash bags of this type has a stretched relatively thin central portion between unstretched, relatively thick and wide end portions of the tape. The end portions are heat sealed at the sides of the bag. This stretched tape has an economic advantage and improved load carrying characteristics.

It is an object of the present invention to provide a method of and apparatus for intermittently stretching thermoplastic tape to produce such draw tapes for bags.

It is another object of the invention to provide tape stretching apparatus which can be easily synchronized with thermoplastic bag making machinery.

It is another object of the present invention to provide stretching apparatus in which the stretching can take place over a period of time that is greater than the cycle time for the bag machine.

RELATED APPLICATIONS

"METHOD & APPARATUS FOR MANUFACTURING DRAW TAPE BAGS", Boyd, et al, Ser. No. 652,254, filed Sept. 20, 1984, U.S. Pat. No. 4,624,654, describes an overall draw tape bag manufacturing line; "METHOD & APPARATUS FOR FORMING HEMS IN SUPERPOSED PLIABLE PANELS", Boyd et al, Ser. No. 652,255, filed Sept. 20, 1984, U.S. Pat. No. 4,617,008, describes a hem forming apparatus used with the line; "INSERTION OF DRAW TAPE STRIPS IN DRAW TAPE BAG MANUFACTURE", Boyd, et al, Ser. No. 652,252, filed Sept. 20, 1984, U.S. Pat. No. 4,597,750, describes the apparatus for inserting the draw tape into the bag. "BAG HAVING INTERMITTENT ORIENTATION DRAW TAPE", Herrington, Ser. No. 722,045 filed Apr. 11, 1985, U.S. Pat. No. 4,628,536, describes an intermittently oriented draw tape. The foregoing applications are incorporated herein by reference.

SUMMARY OF THE INVENTION

In accordance with the present invention, thermoplastic tape is intermittently stretched and oriented by stationary clamps and movable clamps which have a clamping length equal to the length of the unstretched end portions of the draw tape. The movable clamps are moved to stretch the tape to produce relatively thin and narrow central portions of the tape between the end portions.

In accordance with the invention, a single stretching operation produces multiple thin and narrow central portions of the tape. The tape orienting apparatus of the invention is operated in synchronism with bag making machinery which makes the thermoplastic bags. In accordance with the invention, it is possible to carry out the stretching operation in a time which is longer than the cycle time of the bag making machinery required to produce one bag. Because multiple stretched central portions of the tape are produced, the tape can be fed in line to the bag making machinery.

In the preferred embodiment of the invention, four stationary clamps and three movable clamps stretch six segments of the tape simultaneously. Typical bag making machinery has a cycle of ½ second. The apparatus of the preferred embodiment extends the available time for stretching to three seconds, as an example.

The foregoing and other objects, features and advantages of the invention will be better understood from the following more detailed description and appended claims.

SHORT DESCRIPTION OF THE DRAWINGS

FIG. 2A is an example of a stationary clamp shown in FIG. 2;

FIG. 2B is an example of a movable clamp shown in Fig.2;

FIG. 2C is another example of a movable clamp shown in FIG. 2;

FIG. 4A is an example of the movable clamps shown in FIG. 4; and

DESCRIPTION OF THE PREFERRED EMBODIMENT

Figure 1:
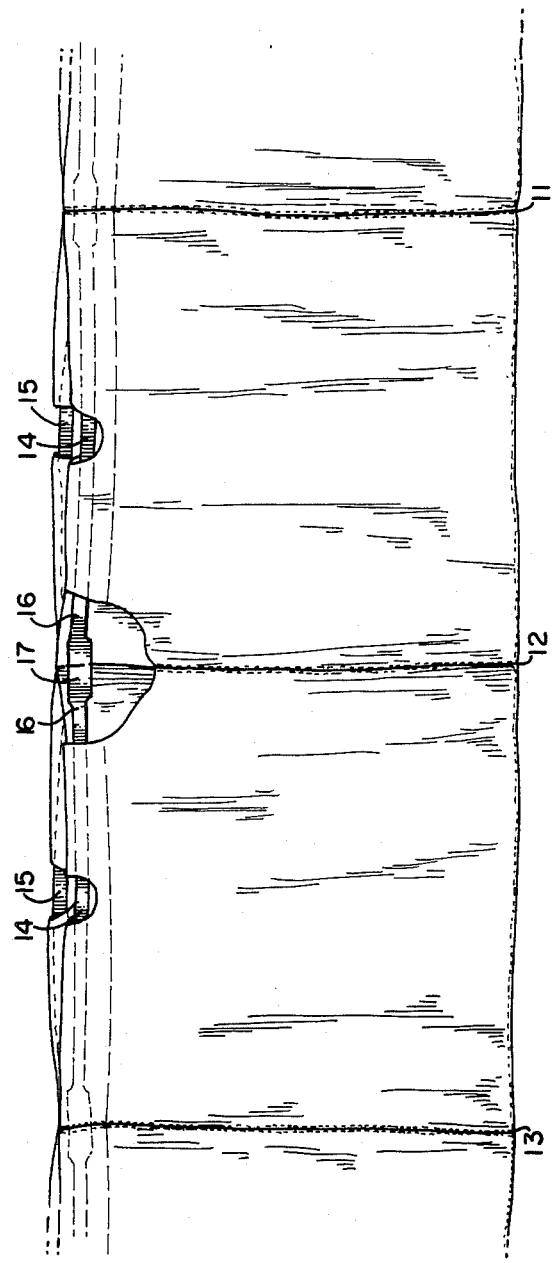
FIGS. 1 and 1A show a series of bags with the draw tape made in accordance with the present invention.
Figure 1A:
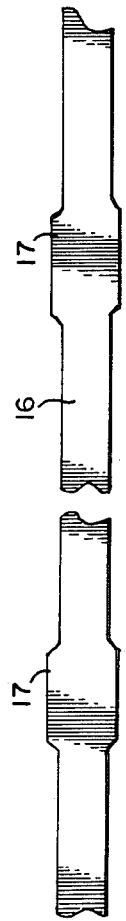

FIG. 1 shows bags for carrying trash. They include two panels which are formed from an extruded tube of polyethylene. The sides of the panels are heat sealed and cut from the tube at 11, 12 and 13 in a perpendicular direction. The tube is slit along one side to form open tops in the bag for reception of trash and the like. Hem portions of each panel are folded over adjacent the top. Draw tapes 14 and 15 are secured by the heat seal at the sides of the panels. A cut-out in each panel and hem portion at the middle of the bag, exposes the draw tapes so they can be grasped. When the bag is loaded with trash, the bag is grasped by the draw tape, thereby closing the bag. The draw tapes can thereafter be tied forming a neat bundle.

The draw tape has a relatively thin and narrow central portion 16 of stretched, oriented, polyethylene and end portions 17 at the extremities. The relatively thick and wide end portions are unstretched, unoriented, polyethylene tape. The heat seal which secures the draw tape to the sides of the panels is through the relatively thick and wide end portions.

Figure 2:
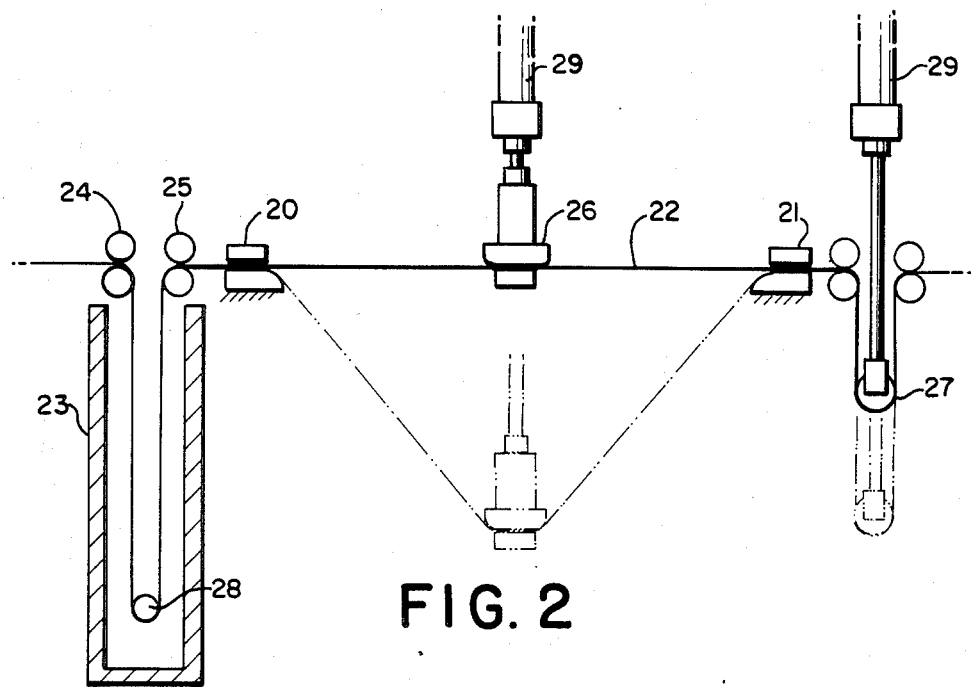
FIG. 2 shows an embodiment of the present invention.

FIG. 2 shows the apparatus of the present invention wherein stationary clamps 20 and 21 have thermoplastic tape 22 extending between them. An oven 23 and nip rolls 24 and 25 provide means for feeding the thermoplastic tape to the stationary clamps 20 and 21.

While the stationary clamps 20 and 21 have been shown schematically in FIG. 2 it is to be understood that each is provided with suitable means for opening and closing the clamps. An example of such suitable means is shown in FIG. 2A in connection with stationary clamp 20 wherein an air cylinder 20a is adapted to open and close the stationary clamp 20 of FIG. 2. It is to be understood that a similar arrangement can be utilized for opening and closing the stationary clamp 21.

A movable clamp 26 is normally in the plane extending between stationary clamps 20 and 21. Intermittently, this movable clamp 26 operated by an air cylinder 29 moves away from the stationary clamps 20 and 21 to the broken line position shown in FIG. 2 to stretch the draw tape.

While the movable clamp 26 has been illustrated schematically in FIG. 2 it is to be understood that suitable means may be provided for opening and closing the movable clamp. One suitable arrangement is illustrated in FIG. 2B. As may be seen in FIG. 2B the movable pad 26a of the movable clamp 26 is supported on the upper end of a guide rod 26b which is carried for reciprocating movement in a pair of bushings 26c positioned in a fixed base 26d. The lower end of the guide rod 26b is provided with a stop member 26e and a compression spring 26f surrounds the upper portion of the guide rod 26d between the lower end of the pad 26a and the upper end of the fixed support 26d. When the air cylinder 29 extends, FIG. 2, moving the clamp 26 down from the full line position to the broken line position, it squeezes the tape against the pad 26a, FIG. 2B. The pad 26a is held upward against the clamp 26 by the spring load on spring 26f. The upward travel of the pad 26a is limited by the stop 26e on the bottom of the guide rod 26b so that the clamp 26 will release when it goes higher than where the pad 26a is stopped. This causes the movable clamp 26 to open with respect to the tape.

It is to be understood that the movable clamp 26 may take other forms such, for example, as the alternative arrangement shown in FIG. 2C. As shown in FIG. 2C the alternative movable clamp 26' has secured to the upper surface thereof a bracket 26g' which supports a supplemental air cylinder 26h' the plunger of which is attached to the movable pad 26a'. The pad 26a' is adapted to move up and down on a pair of guide rods 26i' which depend from the bracket 26g'. Thus it will be seen that the movable clamp 26' is opened and closed with respect to the tape passing over the pad 26a' under the action of the air cylinder 26h'. The cylinder 29, FIG. 2, is adapted to move the movable clamp 26' in the same manner previously described in connection with the clamp 26 in FIG. 2.

Clamps 20, 21 and 26 have a clamping length which is equal to the length of the unstretched end portions 17 of the tape. As an example, consider a tape which has a 2" end portion every 30 inches, e.g., for a 30" wide bag. The stretch ratio for the 28" stretched portions is 5:1. In this example, stationary clamps 20 and 21 have a clamping length of 2" and are spaced 13.2" apart. Movable clamp 26 also has a 2" clamping length, and it is normally positioned at the center of the 13.2" separation between stationary clamps 20 and 21. This leaves two equal unclamped segments that are each 5.6" long. The movable clamp moves out of the plane of the tape by a distance of approximately 25", so that the portions that were originally 5.6" are stretched to a length of 28". All three clamps then release the tape and the movable clamp 26 returns to its original position in the plane of the other two clamps.

A dancer roll 27 at the exit end of the apparatus is moved downwardly to its broken line position to pull the stretched tape from the stretching apparatus and make it available for insertion into the bags.

Simultaneously, the dancer roll 28 in the entrance end of the apparatus moves upwardly so that a new section of tape can be advanced for stretching.

It is necessary that the tape be heated prior to entering this stretching device in order to avoid line-drawing and obtain smooth orientation. This can be accomplished by oven 23, but it is also necessary that the infeed. nip roll 25 be heated to avoid cooling off the tape.

Alternatively, a heated platen may be brought into contact with the segments to be stretched to ensure that the tape is well heated prior to stretching.

Air cylinders 29 operate the movable clamp 26 and dancer roll 27 respectively.

One advantage of the invention is that the stretching can take place over a period of time that is greater than the cycle time for the bag machine. For example, a typical bag-making process will cycle every ½ second. But since two pieces of tape are being stretched simultaneously, the actual time for the stretching cycle is one second.

Figure 3:
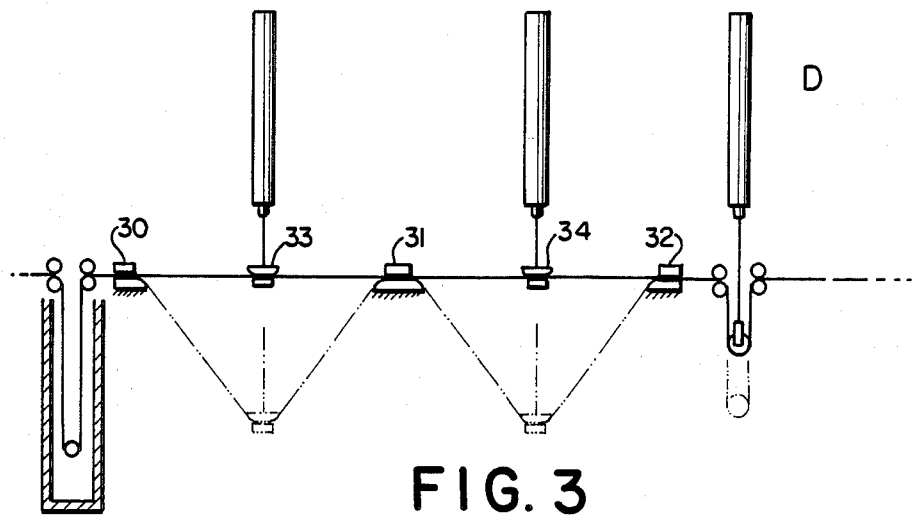
FIG. 3 shows another embodiment of the present invention.

FIG. 3 shows the invention extended to have three stationary clamps 30–32 and two moving clamps 33 and 34, so that four tape segments are being stretched simultaneously, thus doubling the available time to 2 seconds. It is to be understood that the stationary clamps 30–32 may be of similar construction to the stationary clamps 20 and 21 shown in FIGS. 2 and 2A. It is further to be understood that the movable clamps 33 and 34 in FIG. 3 may likewise be of similar construction to the movable clamp 26 and 26' shown in FIGS. 2, 2b and 2c and described above.

Figure 4:
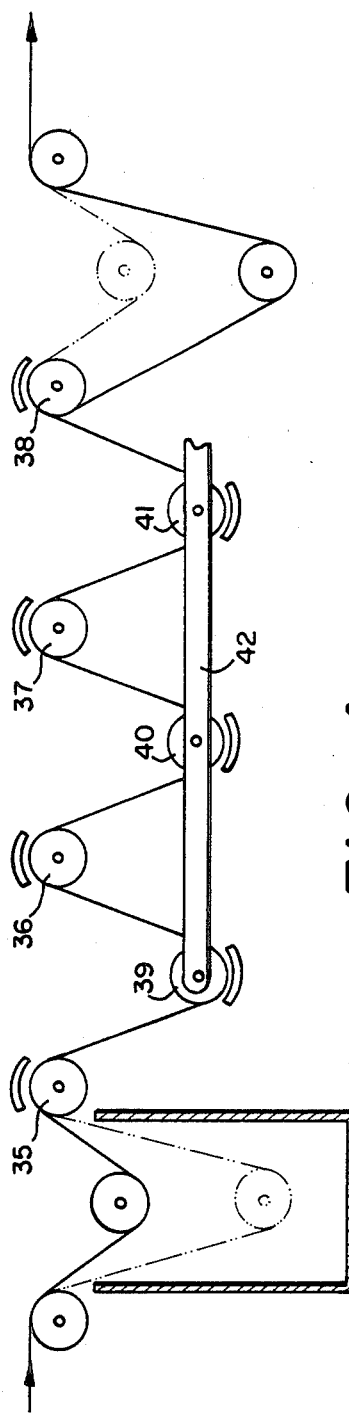
FIG. 4 shows the preferred embodiment of the invention.

FIG. 4 shows the preferred embodiment of the invention wherein stationary clamps 35–38 each include a stationary roll and a shoe which is movable into engagement with the roll to clamp the tape. The shoes have a length equal to the length of the unstretched end portions of the tape, 2" in the example. It is to be understood that the stationary clamps 35–38 may be opened and closed in a similar manner to the stationary clamps 20 and 21 shown in FIGS. 2 and 2A. Thus the stationary roll in clamps 35–38 corresponds to the fixed pads in the stationary clamps 20 and 21 in FIGS. 2 and 2A and the movable shoe of clamps 35–38 is adapted to be operated by an air cylinder similar to air cylinder 20a in FIG. 2A.

Movable clamps 39–41 each include a roll and a shoe for clamping the tape. The movable clamps 39–41 are mounted on an arm 42 which moves the clamps downwardly to stretch the tape. In this embodiment of the invention, six segments of tape are simultaneously stretched.

The details for opening and closing the movable clamps 39–41 have been illustrated in FIG. 4A with respect to the movable clamp 40. As shown in FIG. 4A the movable arm 42 which supports the roll of clamp 40 has structure 42a depending therefrom which is adapted to support an air cylinder 40b which in turn supports the clamp shoe 40a. The air cylinder 40b is adapted to move the clamp shoe vertically to clamp the tape between the roll and the clamp shoe 40a or to release the tape when the clamp shoe 40a has been moved in a downward position by the air cylinder 40b as shown in FIG. 4A. Since the clamp shoe 40a and the air cylinder 40B are both carried by the arm 42, these parts will move up and down with the arm 42 to stretch the tape in the manner described above. It is to be understood that the other movable clamps 39 and 41 and their associated clamp shoes are operated in the same manner as clamp 40 as described above and illustrated in FIG. 4A.

Figure 5:
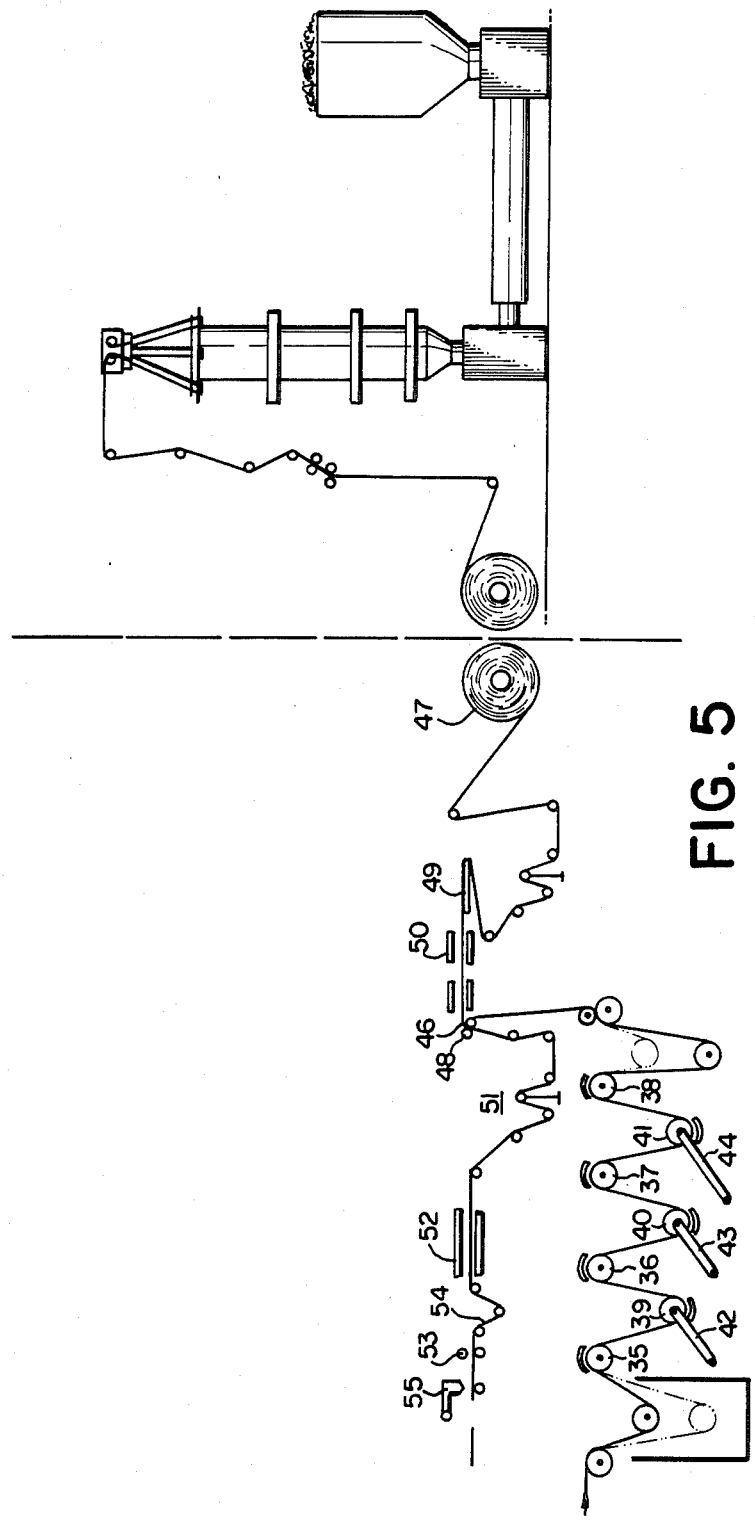
FIG. 5 depicts a manufacturing line for the bags which includes the apparatus of the present invention for intermittently stretching the draw tape prior to insertion into the bags.

FIG. 5 shows the stretching apparatus of FIG. 4 in combination with bag making machinery wherein like reference numerals in FIG. 4 are used to denote like parts. In FIG. 5 it will be noted that the movable clamps 39–41 are mounted on individual arms 42–44 respectively for moving the clamps downwardly to stretch the tape. It is to be understood that the movable clamps 39–41 may all be mounted on a single arm as shown in FIG. 4. It is necessary to synchronize the stretching apparatus of the present invention with the bag-making machine in two respects:

1. Cyclic register: There must be exactly one end portion in the tape for every cycle of the bag machine. The cycling of the stretching device can be timed by an internal timer which operates the cycle and then waits for a signal to start again. The signal can come from the bag machine, one pulse for every sixth rotation of the crank which advances the bags or, one pull for every fourth rotation of the crank, in the case of the double-length device of FIG. 3.

2. Linear speed match: The linear speed of the exiting oriented tape must be the same as the speed of the film entering the bag machine, in order to match tensions. The exit dancer will travel downward while the tape is advancing, then will move upward while the clamps are closed. The height of that exit dancer at its highest point can be sensed to determine whether the tape is moving faster or slower than it is being taken away by the film. If it is slower, the dancer will be higher with each cycle, and vice versa. If the dancer rises, a controller then increases the stroke of the movable clamp so that the tape is stretched a bit more, so there is more tape between interruptions, and the tape is moving faster. The stretched tape is fed into the tape inserter 46 where it is inserted into the hem of a continuously moving line of bags.

The remainder of the line for producing draw tape bags shown in FIG. 5 is more fully described in the aforementioned applications. Briefly, a roll 47 feeds a continuous, extruded tube of polyethylene which has been slit and folded along a median longitudinal line. The material is drawn from the roll 47 by pinch rollers 48. These draw the folded film, forming the two opposing panels, through a hemmer 49 and through a punch 50 which forms the cut-outs in each panel. The continuous line of bags passes through the tape inserter 46 where the draw tape from the stretching apparatus of the present invention is inserted into each hem of the bag.

The continuous length of film with the draw tapes inserted in the hem thereof is advanced from the pinch rollers 48, through rollers 51 and a hem sealer 52, by means of a second pair of pinch rollers 53. As the length of continuous hem sealed film exits the hem sealer 52, it passes through a set of dancer rolls 54, to the seal cutter assembly 55. The reciprocating heat seal bar carries a knife edge into contact with the moving web in an intermittent action timed to form a heat seal down the sides of each bag at regular intervals along its length. After bonding, the seal bar also severs the continuous length of film through the center of the heat seal, thereby separating individual bags from the continuous length of film.

While a particular embodiment of the invention has been shown and described, various modifications are within the true spirit and scope of the invention. The appended claims are, therefore, intended to cover all such modifications.

What is claimed is:

1. Apparatus for forming a thermoplastic draw tape having thick and wide end portions with a relatively thin and narrow central portion between said end portions, comprising:

means for feeding thermoplastic tape along a path of travel;

a pair of stationary clamps spaced along the path of travel of the thermoplastic tape for clamping the tape;

a movable clamp positioned along the path of travel of the thermoplastic tape intermediate said pair of stationary clamps for clamping the tape, each of said clamps having a clamping length equal to the length of unstretched end portions to be formed in the thermoplastic draw tape; and means for stretching the thermoplastic tape between the unstretched end portions by moving said movable clamp away from said stationary clamps to produce said relatively thin and narrow central portions in the thermoplastic draw tape between the unstretched end portions.

2. Apparatus according to claim 1 wherein said movable clamp is normally in the plane of the line between said stationary clamps and is movable away from said plane.

3. Apparatus according to claim 1 wherein said movable clamp comprises:

a roller normally positioned below said stationary clamps; and a shoe for clamping said tape against said roller, said roller being movable away from said stationary clamps.

4. Apparatus according to claim 3 further comprising:
a plurality of said movable clamps and a plurality of said stationary clamps, one of said movable clamps being between each pair of stationary clamps, said movable clamps being moved away from said stationary clamps simultaneously to produce draw tape having a plurality of stretched, relatively thin and narrow central portions between unstretched end portions.

5. Apparatus according to claim 1 further comprising:
an exit dancer roll on the exit end of said apparatus, said dancer roll being movable to draw stretched tape out of said apparatus.

6. Apparatus according to claim 1 further comprising:
means for heating the thermoplastic tape before it is fed between said clamps.

7. Apparatus according to claim 6 wherein said means for heating comprises:
an oven having a dancer roll therein, said dancer roll being movable as a section of tape is fed between said clamps.

8. Apparatus according to claim 1 in combination with bag making machinery, including means for inserting said draw tape into a folded hem of a continuous line of bags; and
means for heat sealing said tape to the sides of each bag through said thick and wide end portions of said draw tape.

9. Apparatus according to claim 8 wherein said tape is stretched in synchronism with said bag making machinery.

10. Apparatus according to claim 9 wherein the time period of said stretching is greater than the cycle time of said bag making machinery for producing each bag.

* * * * *